Figure 1:
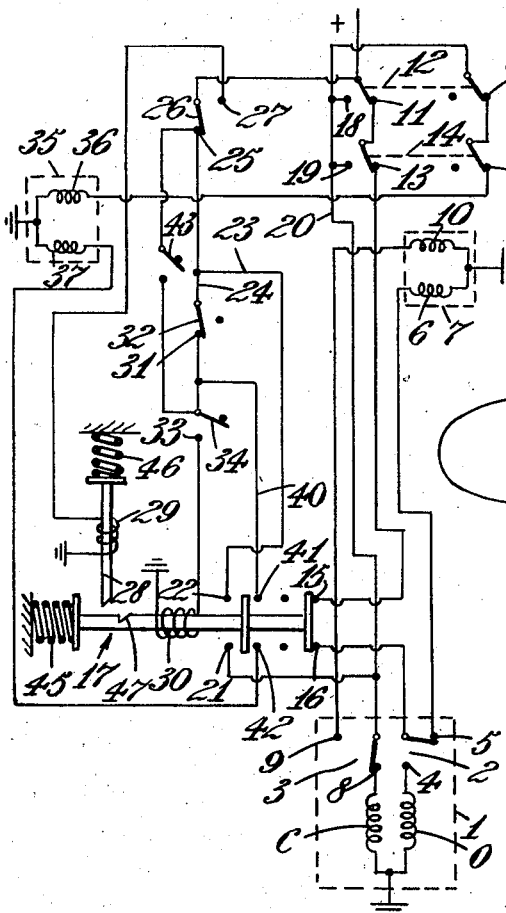

Nov. 17, 1959     S. G. HOOKER     2,912,822
PROTECTIVE SYSTEMS FOR GAS TURBINE PROPULSION POWER PLANTS
Filed June 18, 1956

Inventor.
S. G. Hooker

United States Patent Office 2,912,822
Patented Nov. 17, 1959

2,912,822

PROTECTIVE SYSTEMS FOR GAS TURBINE PROPULSION POWER PLANTS

Stanley George Hooker, Bristol, England, assignor, by mesne assignments, to Bristol Aero-Engines Limited, Bristol, England, a British company Application June 18, 1956, Serial No. 592,149

Claims priority, application Great Britain June 27, 1955

18 Claims. (Cl. 60—39.09)

This invention relates to protective systems for gas turbine propulsion power plants which power plants are of the kind hereinafter referred to as of the kind described, comprising a turbine rotor coupled to a screw propeller by a mechanical transmission, and a compressor in flow series with and upstream of the propeller-driving turbine rotor and driven by the same or a different turbine rotor.

The object of the present invention is to provide for a power plant of the kind described a protective system for preventing dangerous overspeeding of the turbine rotor normally coupled to the propeller in the event of a failure of the transmission causing disconnection of the turbine rotor from the propeller.

According to the invention a protective system for a power plant of the kind described comprises a quick acting fuel shut-off cock or equivalent means operation of which stops the supply of fuel to the power plant, electro-magnetic means for closing or initiating the closing of said fuel shut-off cock or operation of the equivalent means in the sense to stop the supply of fuel, two electrical switches in circuit with the electro-magnetic means, each of said electrical switches having an "on" position and being arranged so that only when both switches are "on" can closing of said fuel shut-off cock or operation of the equivalent means in the sense to stop the supply of fuel be effected or initiated by said electro-magnetic means, compressor speed responsive means responsive to the speed of the compressor of the power plant for moving one of said switches to its "on" position when the speed of the compressor of the power plant exceeds a predetermined value and for holding the switch in its "on" position while the speed of the compressor is in excess of said predetermined value, and signal responsive means responsive to a signal dependent on the torque transmitted to the propeller of the power plant for moving the other of said switches to its "on" position when said torque falls below a predetermined value and for holding the switch in its "on" position while the torque transmitted to the propeller is less than the predetermined value.

According to a feature of the invention, in a system as defined in the preceding paragraph, when applied to an aircraft propulsion plant, said signal responsive means may be made responsive to a signal which is the difference between a signal proportional to torque transmitted to the propeller of the power plant and a signal proportional to the delivery pressure of the compressor of the power plant, so that, if the torque signal is the greater, said other switch is in its "on" position when the difference between the signals is less than a predetermined fixed value, or if the torque signal is the lesser, said other switch is in its "on" position when the difference between the signals is more than a predetermined fixed value.

Such an arrangement has the advantage that, at sea level, the fuel shut-off cock can be arranged to close or the equivalent means be operated in the sense to stop the supply of fuel at an earlier stage during the falling off of torque due to a failure of the transmission than would otherwise be possible without risk of inadvertent closing of the cock or operation of the means to stop the supply of fuel at high altitudes due to the falling off of torque which occurs naturally as the altitude increases. In effect, the falling off of the compressor delivery pressure which also occurs as the altitude increases is used to compensate for the natural falling off in torque as the altitude increases.

According to a further feature of the invention, when said electro-magnetic means is for initiating the closing of said fuel shut-off cock or operation of said equivalent means in the sense to stop the supply of fuel, further electro-magnetic means may be provided for opening and closing said fuel shut-off cock or for operating said equivalent means, in which case said further electro-magnetic means preferably comprises a reversible electro-magnetic actuator.

According to a further feature of the present invention electro-magnetically releasable latching means may be provided for locking the system with the fuel shut-off cock or equivalent means in its position stopping the supply of fuel once it has been moved to such position.

According to a still further feature of the invention the system may include a disarming switch having an "arming" position in which it co-operates with said two electrical switches to permit closing of the fuel shut-off cock or equivalent means to be initiated by said first said electro-magnetic means, and a "disarming" position in which it initiates release of said latching means and overrides said two electrical switches to permit opening of said fuel shut-off cock or operation of the equivalent means in the sense to permit supply of fuel to be effected by said further electro-magnetic means.

The system preferably also includes a testing switch which is arranged, when moved to its closed position, to override said one of said two electrical switches and permit closing of said fuel shut-off cock or operation of the equivalent means in the sense to stop the supply of fuel to be effected or initiated by said first said electro-magnetic means when the power plant is stopped or idling.

Figure 2:
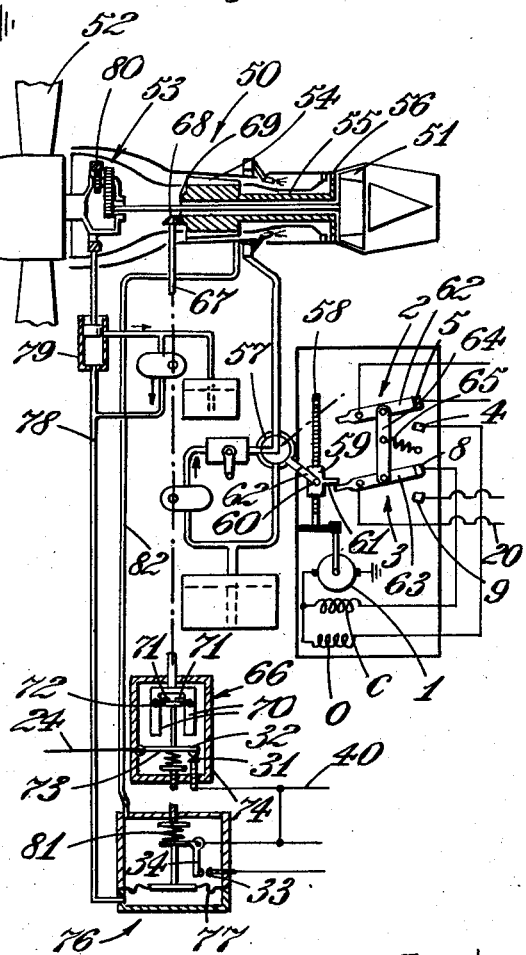

One embodiment of the present invention will now be described, merely by way of example, with reference to the accompanying drawings in which Figure 1 shows diagrammatically the electrical circuit of a protective system according to the invention, and Figure 2 shows an aircraft gas turbine propulsion power plant to which the protective system is applied, and also the mechanical part of the system.

Referring to the drawings, the aircraft gas turbine propulsion power plant is generally indicated at 50 and comprises a low pressure turbine rotor 51 coupled to drive an airscrew 52 through a mechanical transmission including an epicyclic speed reduction gear generally indicated at 53. The power plant further comprises a compressor 54 in flow series with and upstream of the rotor 51, the compressor 54 being connected by a shaft 55 to be driven by a high pressure turbine rotor 56. The protective system for the power plant comprises a reversible electro-magnetic actuator 1 for operating a fuel shut-off cock 57. The actuator 1 is of the geared motor type with a split field winding represented by the coils C (for "closing") and O (for "opening"), that is to say, energization of the coil O causes the actuator 1 to rotate in a direction to open the fuel shut-off cock 57 and energization of the coil C causes the actuator to rotate in the opposite direction to close the fuel shut-off cock 57. The actuator also comprises two limit switches 2 and 3 of which the switch 2 is operated at the end of the opening movement to break the circuit to the coil O at 4 and make a circuit at 5 including a solenoid coil 6 of a two position flag indicator 7, and the switch 3 is operated at the end of the closing movement to break the circuit of the coil C at 8 and make a circuit at 9 including a further solenoid coil 10 of the flag indicator 7. The two switches 2 and 3 are mechanically interconnected so that at the end of the closing movement the switch 2 is also reset to contact 4, and similarly, at the end of the opening movement the switch 3 is reset to contact 8.

The actuator 1 drives a threaded rod 58 upon which is mounted a block 59, the rod passing through a threaded bore in the block and the block being held against rotation so that upon rotation of the rod the block is moved along the rod.

Movement of the block is arranged to operate the fuel shut-off cock 57 and the limit switches 2 and 3. To this end the block has a projecting pin 60 and a projecting striker 61, the pin 60 engaging between the arms of a forked lever 62 angular movement of which in one direction opens the fuel shut-off cock 57, and in the other direction closes the fuel shut-off cock, and the striker 61 being arranged to operate the limit switches 2 and 3 in the manner which will now be explained.

Each limit switch 2 and 3 is provided with a pivoted operating lever 62 and 63 respectively one end of which lies in the path of movement of the striker 61. The striker is arranged to move between the levers 62 and 63 and to operate the limit switches after the block 59 has been moved sufficiently far along the rod 58 to fully open or to fully close the shut-off cock 57, the switches being mechanically interconnected for operation together as described above by a link 64 connecting the switch operating levers 62 and 63. Thus, for example, when the shut-off cock is in its fully open position, as shown in Figure 2, the levers 62 and 63 are set so that the striker 61 will engage the end of the lever 62 when the block is moved along the rod in the direction to close the shut-off cock. When so set the levers 62 and 63 are positioned so that the end of the lever 62 is engaged by the striker before the block reaches a position in which the shut-off cock has been fully closed. When the striker engages the lever 62 both switch operating levers are moved, the lever 62 directly by the striker and the lever 63 through the connecting link 64.

The limit switches are not however operated until each switch operating lever has been moved just past a dead centre position in relation to a compression toggle spring 65. The toggle spring then acts to change over the limit switches with a quick make and break action and to move the switch operating levers further past their dead centre position to a limiting position in which the end of the lever 63 is set to a position in which it will be engaged by the striker 61 when the block is moved along the rod in the direction to open the shut-off cock, the striker, after engaging the end of the lever 63 again changing over the limit switches as previously described and re-setting the levers 62 and 63 to their original position as shown in Figure 2.

Once the limit switches have been operated consequent upon movement of the block along the rod, in the direction to close the fuel shut-off cock and in the direction to open the fuel shut-off cock, movement of the block, of course stops because the actuator 1 ceases to rotate. The positions of the block on the rod in which the striker has moved the levers just past their dead centre positions therefore are the limiting positions of the block, and it is arranged that in these positions the block will have adjusted the shut-off cock into its fully closed and fully open positions respectively.

Referring now to Figure 1, current is supplied to the opening coil O from a source + through a normally closed contact 11 of an engine starting switch 12, a normally closed contact 13 of a fire-emergency switch 14 and a pair of normally closed contacts 15 and 16 of a two-position electro-magnetically operated switch 17. During normal running the switches 12 and 14 complete the circuit at contacts 11 and 13 so that the fuel shut-off cock remains open, such state being shown by the flag indicator 7, the coil 6 of which is energized at the end of the opening movement from the source + through the contacts 11 and 13, the normally closed contacts 15, 16 and switch 2 which closes onto contact 5 at the end of the opening movement. Changing over of the starting switch 12 to a contact 18 or of the fire-emergency switch 14 to a contact 19 breaks the circuit to the coil O and energizes the closing coil C through the conductor 20 so that the fuel shut-off cock is closed.

The closing coil C can also be energized through a pair of normally open contacts 21, 22 on the switch 17, conductors 23, 24 and contact 25 of a disarming switch 26 which, in its arming position, is closed on contact 25. Thus, except when the disarming switch is in its "disarmed" position, making connection at a contact 27, the closing coil C will be energized to close the fuel shut-off cock on operation of the switch 17 to adjust the switch from its first position, as shown in Figure 1, to its second position in which it opens the contacts 15, 16 and 41, 42 later described, and closes the contacts 21, 22. Operation of the switch 17 also breaks the circuit to the coil 6 of the flag indicator 7 and a circuit to the coil 10 of the indicator is completed through the switch 3 so that the indicator 7 changes over to indicate that the fuel shut-off cock has been closed when the fuel shut-off cock has been closed. When the switch 17 has been operated, in the manner presently described, it is held in its second i.e. operated position, against the action of a spring 45, by a latch 28 which engages in a notch 47 in the switch. The latch 28 is electro-magnetically withdrawable to an inoperative position against the action of a spring 46, which urges the latch into the notch 47 when the switch 17 is operated, by energization of a coil 29 which is in circuit with the contact 27 of the disarming switch 26. Changing over of the switch 26 to the "disarmed" position thus withdraws the latch 28 to its inoperative position, and, if the switch 17 is in its operated position, releases the switch 17 so that the switch is returned to its first position by the spring 45. When the switch 17 is operated therefore, and the fuel shut-off cock consequently closed, change over of the disarming switch 26 from its arming to its disarming position breaks the circuit through contacts 21, 22 to the closing coil C, and energizes the opening coil O so that the fuel shut-off cock is re-opened.

The switch 17 is operated by a coil 30 which is energized through the contact 25 of the disarming switch, and contacts 31 and 33 of two electrical switches 32 and 34. The switch 32 is operated by a compressor speed responsive device generally indicated at 66 in Figure 2 which is responsive to the speed of the compressor 54 so that it makes connection at the contact 31 when the speed of the compressor is in excess of a value selected as presently described. The compressor speed responsive device comprises a shaft 67 driven by gearing 68, 69 from the compressor shaft 55 and carrying a pair of flyweights 70 provided with cam lobes 71 which bear through the intermediary of a thrust race 72 upon a spring pressed member 73, carrying one of the contacts of the switch 32. The other contact 31 is adjustably fixed relatively to a casing 74 containing the device, the arrangement being such that at a predetermined speed the thrust of the flyweights overcomes the opposing resistance of the spring pressed member so that the contacts close together.

The switch 34 is operated by a signal responsive means generally indicated at 76 (see Figure 2). The signal responsive means comprises a diaphragm 77 which is subjected, in the direction to break circuit at contact 23 that is to say upwardly in Figure 2, to the pressure of a liquid put under pressure by a torque meter measuring the torque transmitted to the propeller 52. This pressure which is communicated to the diaphragm through a pipe 78 consequently constitutes a torque signal. The torque meter comprises one or more hydraulic jacks, one of which is shown at 79, opposing the reaction of the annular gear 80 of the epicyclic speed reduction gear 53. On its other side the diaphragm 77 is subjected to the pressure of a spring 81 and of the air discharged from the compressor 54, the air pressure which is communicated to the diaphragm through a pipe 82 being less than the torque signal during normal running of the plant and constituting a compressor delivery pressure signal. The contacts will thus close when the difference between the signals is less than the force exerted by the spring 81. The spring 81 is adjusted so that connection is made at contact 33 when, under cruising conditions at high altitude, the torque falls below that which should normally be transmitted, a suitable margin below the normal torque being allowed to ensure that the system is not operated unnecessarily. With this arrangement, when the aircraft is at sea level, the switch 34 makes connection at contact 33 at a higher value of the torque since the compressor delivery pressure is higher under these conditions. Thus, if a transmission failure occurs during take off, the system comes into operation more quickly and the danger of overspeeding occurring before the protective action becomes effective is minimised.

As previously stated, the switch 32 is operated to make connection at contact 31 when the speed of the compressor is in excess of a selected value. This value is fixed by two considerations, firstly that contact should be broken at any compressor speed at which a torque below the critical torque for operating the switch 34 could normally occur under any flying condition up to the limiting altitude of the aircraft, and secondly to avoid unnecessary operation of the system by a phenomenon known as "bump stalling" of the engine which sometimes occurs below a certain compressor speed with engines which have been in service for a considerable time.

From the description already given, it will be understood that when the compressor speed exceeds the value selected from the above-mentioned considerations the switch 32 makes connection at contact 31 and that if then the difference between the torque pressure and the compressor delivery pressure falls below the selected critical value, as it would do in the event of a failure of the transmission system, the switch 34 makes connection at contact 33 so that the coil 30 is energized from the current source + through contacts 25, 31 and 33 and the switch 17 is operated to initiate closing of the fuel shut-off cock in the manner previously described.

On failure of the transmission therefore overspeeding of the engine is prevented. The fact that the fuel cock is now closed is indicated by the flag indicator 7 the coil 10 of which is energized from the source + through the contact 25, conductor 24, conductor 23, contacts 22, 21 and switch 3 which is closed onto contact 9.

A three position flag indicator 35 is also provided giving an "operated" signal on energization of a coil 36 of the indicator, an "armed" signal on energization of a coil 37 of the indicator, and a "disarmed" signal when neither coil is energized. The "operated" coil 36 is energized when the switch 17 is operated and the indicator 35 then indicates this fact. The coil 36 is energized from the conductor 24 through the conductor 23, contacts 22, 21 of switch 17, conductor 20, a second contact 38 of switch 12 and a second contact 39 of switch 14, the switches 12 and 14 being normally closed onto contacts 38 and 39 respectively, that is to say, when the power plant is in operation. Thus when either of the switches 12 or 14 is operated deliberately to close the fuel shut-off cock no "operated" signal is given by the flag indicator 35, such signal being reserved for automatic operation. The "armed" coil 37 of the indicator 35 is arranged to be energized during testing of the system to indicate that the system is properly armed for operation. The coil 37 is energized during testing from contact 25 of the disarming switch 26 through conductor 24, contact 31 of compressor speed switch 32, conductor 40, and the normally closed contacts 41 and 42 of switch 17 previously described. When the switch 17 is operated this circuit is broken at the contacts 41, 42 so that both coils 36 and 37 of the indicator are not energized simultaneously which would result in a "disarmed" signal being given by the indicator 35.

To enable the system to be tested, a switch 43 is also provided across the compressor speed responsive switch 32.

The testing procedure before flight includes the following tests:

(1) With the arming switch 26 closed at contact 25 the engine is speeded up to above the critical speed for the switch 32. The flag indicator 35 should change from "disarmed" to "armed" at the appropriate compressor speed.

(2) While still running at above the critical compressor speed, changing of the disarming switch 26 to make connection at contact 27 should result in a "disarmed" signal by the indicator 35.

(3) On closing the test switch 43 and reducing engine speed, shut down should occur at a certain speed, which will vary with altitude and ambient temperature. The indicator 35 should then show "operated" and the indicator 7 "fuel cock closed."

I claim:

1. In a gas turbine propulsion power plant comprising a screw propeller connected to be driven through a mechanical transmission by the turbine system of the power plant, and a compressor in flow series with and upstream of the turbine system and connected to be driven by the turbine system, a protective system for said power plant comprising quick acting means operable to stop the supply of fuel to the power plant, electro-magnetic means actuable to cause operation of said quick acting means to stop the supply of fuel, two electrical switches for controlling said electro-magnetic means, said switches, when both are "on," actuating said electro-magnetic means to cause operation of said quick acting means to stop the supply of fuel, compressor speed responsive means responsive to the speed of the compressor of the power plant for moving one of said switches to its "on" position when the speed of the compressor of the power plant exceeds a predetermined value and for holding the switch in its "on" position while the speed of the compressor is in excess of said predetermined value, and signal responsive means responsive to a signal dependent on the torque transmitted to the propeller of the power plant for moving the other of said switches to its "on" position when said torque falls below a predetermined value and for holding the the switch in its "on" position while the torque transmitted to the propeller is less than the predetermined value.

2. In an aircraft gas turbine propulsion power plant, a protective system as claimed in claim 1, wherein said signal responsive means is responsive to a signal which is the difference between a first signal proportional to the torque transmitted to the propeller of the power plant and a second signal proportional to the delivery pressure of the compressor of the power plant, said first signal being always greater than said second signal during normal running of the power plant whereby, if the torque signal is the greater said other of said switches is in its "on" position when the difference between the signals is less than a predetermined fixed value.

3. A protective system as claimed in claim 1, wherein said electro-magnetic means comprises a reversible electro-magnetic actuator of the geared motor type having a split field winding energization of one coil of which causes the actuator to rotate in one direction and energization of the other coil of which causes the actuator to rotate in the opposite direction, said actuator when rotated in said one direction operating said quick acting means to stop the supply of fuel to the power plant, and when rotated in said other direction operating said quick acting means to permit the supply of fuel to the power plant, and said reversible electro-magnetic actuator comprises two limit switches operable one at one end of the range of operating movement of said actuator to break the circuit to said one coil of said field winding, and the other at the other end of the range of operating movement of said actuator to break the circuit to said other coil of said field winding.

4. A protective system as claimed in claim 3, wherein each of said limit switches, when open, completes a circuit through indicating means to operate the indicating means to indicate the state of adjustment of said quick acting means.

5. A protective system as claimed in claim 3, wherein said one of said limit switches is arranged, when open, to complete a circuit through one of a pair of coils of a two position flag indicator to move the indicator to one of its positions, and the said other of said limit switches is arranged, when open, to complete a circuit through the other of said pair of coils of said flag indicator, to move the indicator to the other of its positions.

6. A protective system as claimed in claim 3, wherein said other coil of said field winding is energizable through a pair of normally closed contacts of a two-position switch constituting part of said first said electro-magnetic means, and said one coil of said field winding is energizable through a pair of normally open contacts of said two-position switch, and said two-position switch is adjustable from its first position to its second position to open said normally closed contacts and to close said normally open contacts and from its second position to its first position to close said normally closed contacts and to open said normally open contacts.

7. A protective system as claimed in claim 6, wherein the circuit of said other coil of said field winding through said pair of normally closed contacts of said two-position switch includes a first contact of an engine starting switch onto which first contact the engine starting switch is closed when the power plant is in operation, said engine starting switch, when moved to its open position, breaking said circuit of said other coil of said field winding and completing a circuit through said one coil of said field winding thereby to cause said electro-magnetic actuator to rotate to operate said quick acting means to stop the supply of fuel.

8. A protective system as claimed in claim 7, wherein the circuit of said other coil of said field winding through said pair of normally closed contacts of said two-position switch includes a first contact of a fire-emergency switch onto which first contact the fire-emergency switch is normally closed, said fire-emergency switch, when moved to its open position, breaking said circuit of said other coil of said field winding and completing a circuit through said one coil of said field winding thereby to cause said electro-magnetic actuator to rotate to operate said quick acting means to stop the supply of fuel.

9. A protective system as claimed in claim 6 comprising electro-magnetically withdrawable latching means for holding said two-position switch in its second position when the switch has been adjusted into its second position.

10. A protective system as claimed in claim 9, wherein said system includes a disarming switch for controlling said first said electro-magnetic means, and said latching means, said disarming switch having an "arming" position in which it arms said electro-magnetic means for actuation by said two electrical switches to cause operation of said quick acting means to stop the supply of fuel, and a "disarming" position in which it initiates release of said latching means and disarms said electro-magnetic means.

11. A protective system as claimed in claim 10, wherein said disarming switch, in its "arming" position, closes a pair of contacts in series circuit with said two electrical switches and a current source so that said first said electro-magnetic means is energized only when said two electrical switches are in their "on" position and said disarming switch is in its "arming" position.

12. A protective system as claimed in claim 11, wherein said disarming switch, in its "disarming" position, closes a pair of contacts in series circuit with an operating coil of said electro-magnetically releasable latching means and a current source so that when said disarming switch is in its "disarming" position the operating coil of said electro-magnetically releasable latching means is energized and said latching means is withdrawn to an inoperative position.

13. A protective system as claimed in claim 8, wherein said two-position switch, when in its second position, completes a circuit through an indicating means to operate the indicating means to indicate that the two-position switch is in its second position, that is to say that the protective system has been operated.

14. A protective system as claimed in claim 13, wherein said engine starting switch and said fire-emergency switch each have a second contact upon which the switch is normally closed, and the circuit through said indicating means includes the second contact of the engine starting switch and the second contact of the fire-emergency switch.

15. A protective system as claimed in claim 10, comprising a three position flag indicator having two operating coils one of which is energized to move the flag indicator to an "operated" position when said two-position switch is in its second position, the other of which is energized when said two-position switch is in its first position, said one of said two electrical switches is in its "on" position and said disarming switch is in its "arming" position to move the flag indicator to an "armed" position, the flag indicator assuming a "disarmed" position when neither of its operating coils is energized.

16. A protective system as claimed in claim 2, wherein said signal responsive means comprises a diaphragm connected to operate said other of said two electrical switches, said diaphragm being subjected, in the direction to move the switch to its "on" position, to the pressure of spring means and of the air discharged from the compressor of the power plant, and in the other direction, to the pressure of a liquid put under pressure by a torque meter which measures the torque transmitted to the propeller of the power plant.

17. A protective system as claimed in claim 16, wherein said torque meter comprises an hydraulic jack opposing the reaction of an annular gear forming part of an epicyclic speed reduction gear forming part of said mechanical transmission.

18. A protective system as claimed in claim 1, wherein said compressor speed responsive means comprises a rotary member connected to be driven at a speed related to the speed of the compressor and comprising a member displaceable by centrifugal force against a return force, said member being operatively connected to said one of said two electrical switches to move the switch to its "on" position when the speed of the compressor exceeds a predetermined value, and to hold the switch in its "on" position while the speed of the compressor is in excess of said predetermined value.

References Cited in the file of this patent

UNITED STATES PATENTS 2,667,228    Wood et al. _____ Jan. 26, 1954